June 26, 1962 W. BRADY 3,041,100
ACTUATING MECHANISMS FOR VEHICLE DOOR FASTENINGS
Filed June 22, 1960
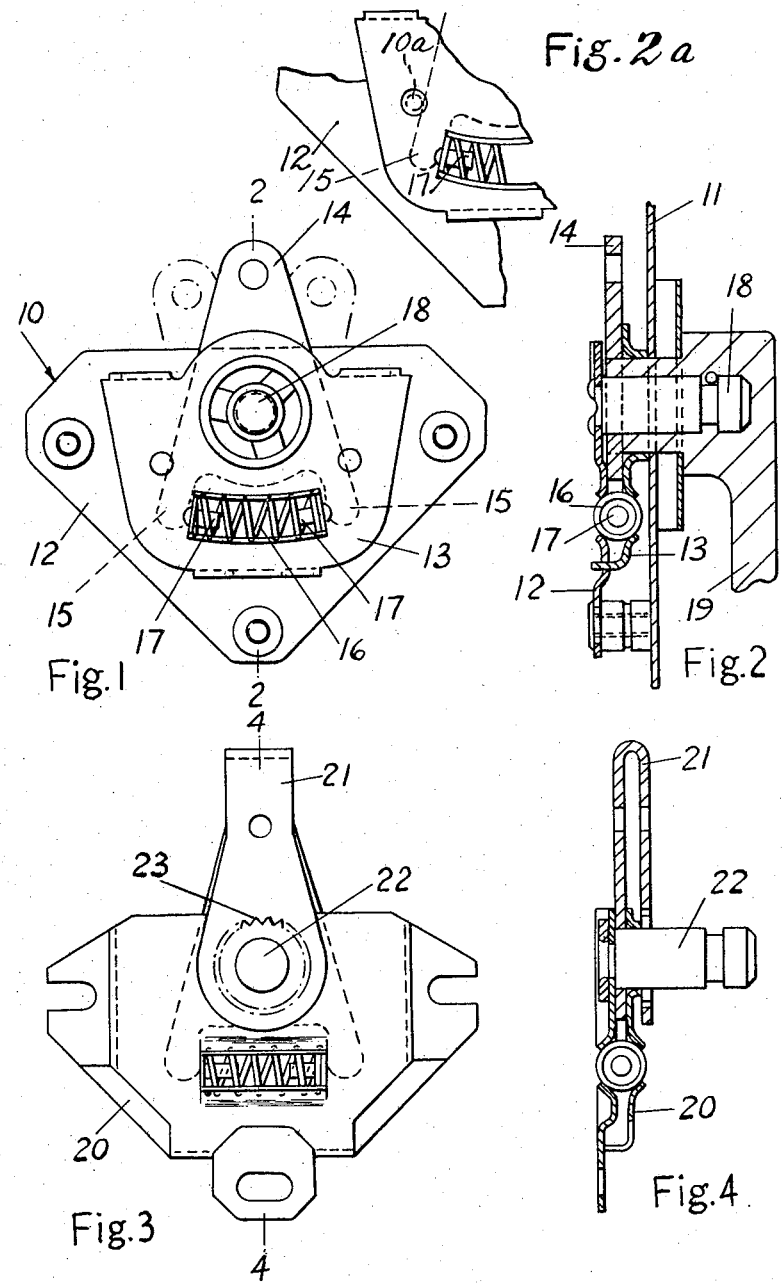
Inventor
W. Brady

United States Patent Office 3,041,100
Patented June 26, 1962

3,041,100
ACTUATING MECHANISMS FOR VEHICLE DOOR FASTENINGS
William Brady, Edgbaston, England, assignor to Wilmot-Breeden Limited, Birmingham, England
Filed June 22, 1960, Ser. No. 37,930
Claims priority, application Great Britain July 9, 1959
5 Claims. (Cl. 292—336.3)

This invention relates to an actuating mechanism for a vehicle door fastening of the kind which is operable manually from the inside of the door to effect release of the fastening and the object of the present invention is to provide a new or improved construction.

An actuating mechanism in accordance with the present invention comprises a body part adapted to be mounted on the door of a vehicle and an operating lever which is pivotally mounted on the body part and which is adapted to be connected to the door fastening, said operating lever having at one end a pair of spaced, opposed abutments, there being also provided resilient means which are disposed between the abutments and which are arranged to be deformed by an abutment when the operating lever is pivoted from a central position in a direction such that said abutment moves towards a reference line which extends through the pivotal axis of the operating lever and a point mid-way between the two abutments when the lever is in its central position, the arrangement being such that said resilient means act to apply a restoring force and urge the operating lever back towards its central position.

The arrangement may be such that either of said two abutments is adapted to deform (e.g. compress) said resilient means, depending on which way the operating lever is pivoted from its central position. In this arrangement the operating lever may be pivoted in either of two directions, the resilient means acting to return said lever to its central position in either case. Alternatively, a stop may be provided which permits of the operating lever being pivoted in one direction only, so that one abutment only is adapted to compress said resilient means.

Preferably, the body part is of hollow configuration or embodies a pair of spaced plates so that at least that end of the operating lever having the pair of abutments is disposed within the body part. The resilient means may then be in the form of a coil spring which is disposed between the abutments with its length extending in a straight line or an arc. The spring would be located within the body part by means of suitable recesses or projections provided therein.

The invention will now be more particularly described with reference to the accompanying drawings wherein:

FIGURES 1 and 2 are respectively an elevation and a sectional view taken on the line 2—2 of FIGURE 1, FIGURE 2 being shown with an operating handle mounted in position.

FIGURE 2a is a fragmentary elevation illustrating a modification.

FIGURES 3 and 4 are respectively an elevation and a sectional view taken on the line 4—4 of FIGURE 3, FIGURES 3 and 4 showing an alternative construction.

Referring now to FIGURES 1 and 2 of the drawings one example of an actuating mechanism constructed in accordance with the present invention is provided with a body part 10 which is adapted to be mounted at any convenient position on a door 11 of a vehicle. Said body part is formed from a pair of plates 12 and 13 which are secured together in any convenient way to provide between them a space into which an operating lever 14 projects. Said operating lever 14 is mounted in the body part for pivotal movement relative thereto.

One end of the operating lever 14 projects outwardly beyond the body part and is adapted to be connected to the door fastening by any suitable linkage. The opposite end of said operating lever is provided with a pair of spaced abutments 15 comprising two spaced tongues of metal which project in a generally outward direction from the pivotal axis. The inner side of each tongue forms one of the abutments 15 referred to above.

There is also provided resilient means in the form of a coil spring 16 which is mounted in the body part. Said spring 16 may be arranged so that its length extends in an arc or in a straight line and the diameter of the spring is slightly greater than the distance between the two plates or two sides of the body part, recesses or apertures being provided in the body part to accommodate the spring. Each end of the spring 16 is provided with a stud 17 which has a flange at its outer end having a diameter equal to or slightly greater than that of the spring so that the spring is located between the flanges of the studs, each of said stud flanges extending across the width of the body part and being located by the adjacent ends of the apertures formed in the body part.

The operating lever 14 is mounted on one end of a spindle 18 which projects through one side of the body part and the other end of said spindle is adapted to receive a handle 19 arranged so that rotation of the handle results in turning of the operating lever.

In the central position of the operating lever the two abutments 15 thereof are arranged one on either side of the coil spring 16 and each abutment is not in pressure engagement with the flange of the adjacent stud 17. If the handle 19 is turned in either direction one of the abutments 15 will be moved towards the centre of the spring and will thereby engage the adjacent stud flange whilst the other abutment will move away from the other stud flange. In this way the spring 16 will be compressed so that when the handle is released a force will be exerted on the operating lever 14 to restore it to its central position. A similar restoring force will be developed if the handle is turned in the opposite direction.

Thus as above described the handle can be rotated in either direction to release the door fastening and the coil spring will exert a restoring force on the lever when the handle is released. Alternatively the mechanism can be modified by providing a stop which permits the handle to be turned in one direction only. This stop may have any convenient form. Thus, it may consist of a stud 10a secured to the body part 10 at one side of the operating lever 14 as shown in FIGURE 2a. Alternatively, the stop may conveniently be formed by bending over an ear of metal from the body part on one side of the operating lever. When this stop is provided, only one of said abutments can then act to compress the spring and the stop can be disposed at either side of the lever as desired.

In an alternative construction shown in FIGURES 3 and 4 the body part is formed from a single piece of metal 20 which is bent to a U-shape configuration and the operating lever is similarly formed from a piece of metal 21 so that said lever and the body part are each of U-shape. The two parts are then arranged so that one limb of the operating lever projects into the space between the two limbs of the body part, part of the other limb of the lever overlying one of the limbs of the body part. In this case the spindle 22 forming a pivot for the operating lever 21 is secured to the body part 20 and extends through a pair of aligned apertures formed in the operating lever. One of said lever apertures is formed around its periphery with a number of teeth or serrations 23 adapted to be engaged with like teeth or serrations formed on a handle which will rotate on the spindle. Thus in this construction the operating lever 21 is not secured to the spindle but in all other essential details the construction is similar to that described above, the body part being provided with a coil spring and the lever with a pair of spaced abutments as before.

Having thus described my invention what I claim as new and desire to secure by Letters Patent is:

1. Mechanism for actuating a vehicle door fastening from the inner side of the door, comprising in combination a body part adapted to be attached to the door, an operating lever pivotally mounted at a position intermediate its ends on said body part and adapted at one end to be connected to the door fastening, a pair of spaced abutments integral with the other end of said operating lever, a manually operable handle coupled to said operating lever, a helical compression spring carried by said body part, and disposed between the abutments on said operating lever so that movement of the latter from its normal position by said handle, to release the door fastening, causes one of the abutments on said operating lever to compress said spring which returns said operating lever to its normal position when said handle is released, and a non-rotatable spindle which is secured to said body part, and on which said operating lever and said handle are rotatably supported.

2. Mechanism according to claim 1, wherein said body part is provided at one side of said operating lever with a stop against which said operating lever bears when in its normal position, said helical compression spring being compressible by only one of the abutments on said operating lever.

3. Mechanism according to claim 1, wherein said body part is composed of a pair of spaced and interconnected plates between which said operating lever extends, and to one of which said non-rotatable spindle is secured.

4. Mechanism according to claim 1, wherein said body part consists of a plate bent to a U-shaped configuration, and said operating lever consists of another plate which is also bent to a U-shaped configuration, and one of the limbs of which extends between the limbs of the first mentioned plate.

5. Mechanism according to claim 1, wherein said helical compression spring is provided at opposite ends respectively with a pair of studs for contact respectively with the abutments on said operating lever.

References Cited in the file of this patent

UNITED STATES PATENTS 2,684,263 McKay _____ July 20, 1954

FOREIGN PATENTS 708,303 Great Britain _____ May 5, 1954